United States Patent [19]

Wiley

[11] 3,996,948
[45] Dec. 14, 1976

[54] TRUCK WASH APPARATUS

[76] Inventor: Robert B. Wiley, 289 6th Ave. North, Tierra Verde, Fla. 33715

[22] Filed: Feb. 18, 1975

[21] Appl. No.: 550,207

[52] U.S. Cl. .............................. 134/45; 15/DIG. 2
[51] Int. Cl.² ......................... B60S 3/04; B08B 3/02
[58] Field of Search ........... 134/45, 123; 15/DIG. 2

[56] References Cited
UNITED STATES PATENTS

| | | | |
|---|---|---|---|
| 3,459,203 | 8/1969 | Pritchard | 134/123 |
| 3,557,808 | 1/1971 | Gusse et al. | 134/45 |
| 3,786,823 | 1/1974 | Wiley | 134/45 |
| 3,844,480 | 10/1974 | Taylor et al. | 134/45 X |

Primary Examiner—Robert L. Bleutge
Attorney, Agent, or Firm—Barnes, Kisselle, Raisch & Choate

[57] ABSTRACT

A truck wash apparatus wherein the truck is moved through the car wash apparatus which includes a pair of vertical supports mounted along the path of the truck such that the truck moves between the supports. A plurality of rotating spray nozzles for dispensing fluid are mounted on the vertical supports for rotation and for indexing between three positions wherein the plane of rotation of said applicator is parallel to the path of the truck, at an angle facing the truck as the truck approaches the supports, at an angle facing away from the truck as the truck moves away from the supports. As the truck moves toward the supports, the rotating spray nozzles are positioned at an angle to the oncoming truck to wash the front of the truck, as the truck continues to move through the system and between the supports, the rotating nozzles are indexed to a position wherein the plane thereof is generally parallel to the path of the truck, and as the truck finally moves away from the supports, the rotating nozzles are indexed such that the planes thereof are at an angle for directing fluid toward the rear of the truck.

6 Claims, 7 Drawing Figures

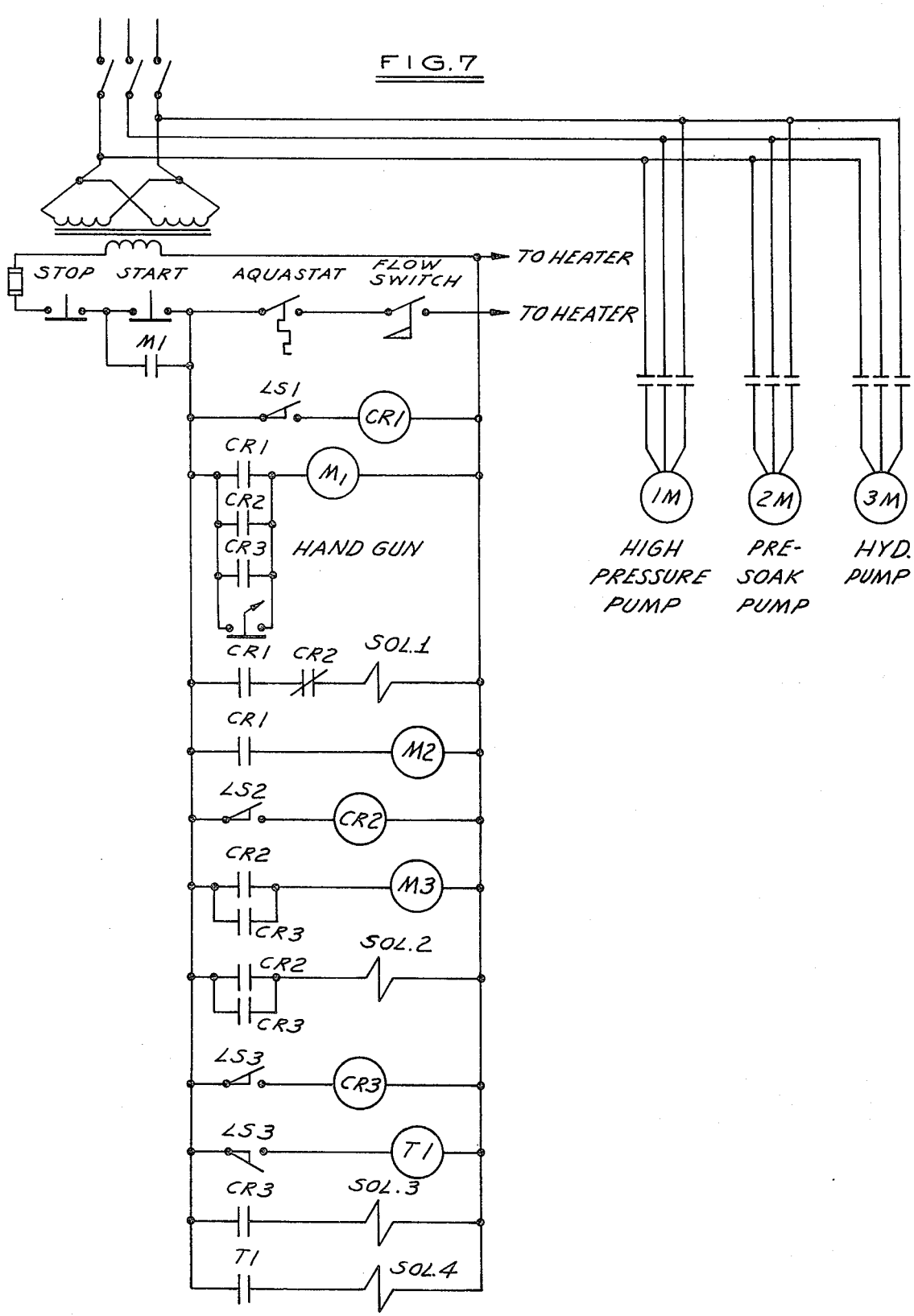

TRUCK WASH APPARATUS

This invention relates to a truck wash apparatus.

BACKGROUND OF THE INVENTION

In washing cars, two types of systems are basically used. In one system, the car is moved through various nozzles and brushes and washed while it is moved. In another type of system, the car is maintained stationary and the nozzles and brushes are moved relative to the car. Neither of these systems is readily adaptable to washing trucks because of the large size of the trucks and the varying lengths thereof.

In my U.S. Pat. No. 3,786,823, there is disclosed and claimed a truck wash apparatus wherein the truck is stationary and a carriage supporting spray nozzles is movable along the sides and ends of the truck. Such an apparatus satisfactorily washes the truck but is relatively expensive.

Accordingly, among the objects of the invention are to provide a truck wash apparatus which is lower in cost and which will effectively wash trucks.

SUMMARY OF THE INVENTION

In accordance with the invention, nozzles are mounted on a pair of supports mounted along the path of the truck such that the truck moves between the supports for rotation and for indexing between three positions wherein the plane of rotation of said nozzles is parallel to the path of the truck, at an angle facing the truck as the truck approaches the supports, at an angle facing away from the truck as the truck moves away from the supports. As the truck moves toward the supports, the rotating nozzles are positioned at an angle to the oncoming truck to wash the front of the truck, as the truck continues to move through the system and between the supports, the rotating nozzles are indexed to a position wherein the plane thereof is generally parallel to the path of the truck, and as the truck finally moves away from the supports, the rotating nozzles are indexed such that the planes thereof are at an angle for directing fluid toward the rear of the truck.

DESCRIPTION OF THE DRAWINGS

FIG. 7 is a schematic wiring diagram utilized in controlling the apparatus embodying the invention. DESCRIPTION Referring to FIG. 1, the truck wash apparatus embodying the invention comprises guide rails 10 that are laid on the floor F between which the truck to be washed is driven to the position for successive washing.

Figure 1:
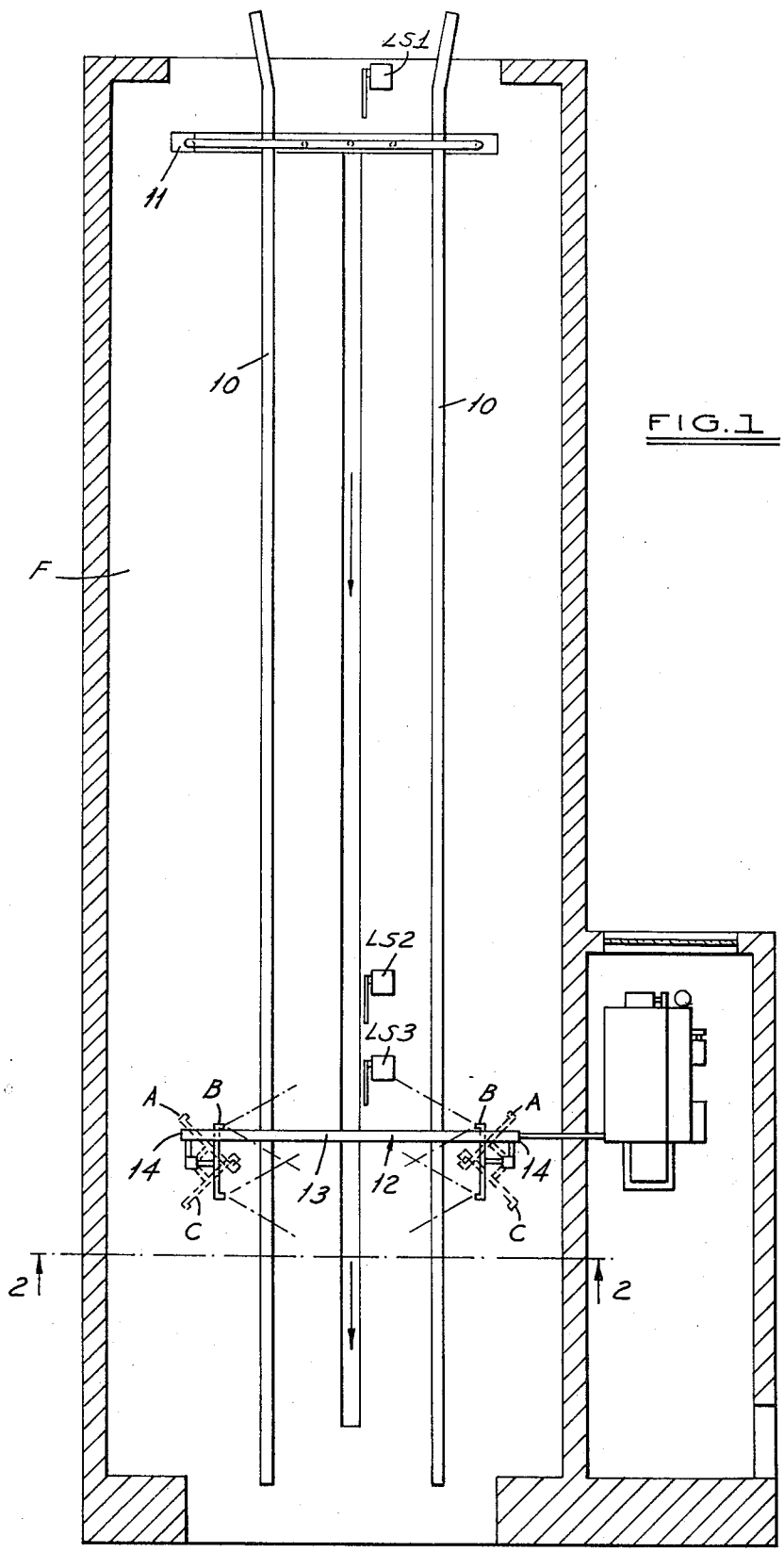
FIG. 1 is a partly diagrammatic plan view of the apparatus embodying the invention.
Figure 2:
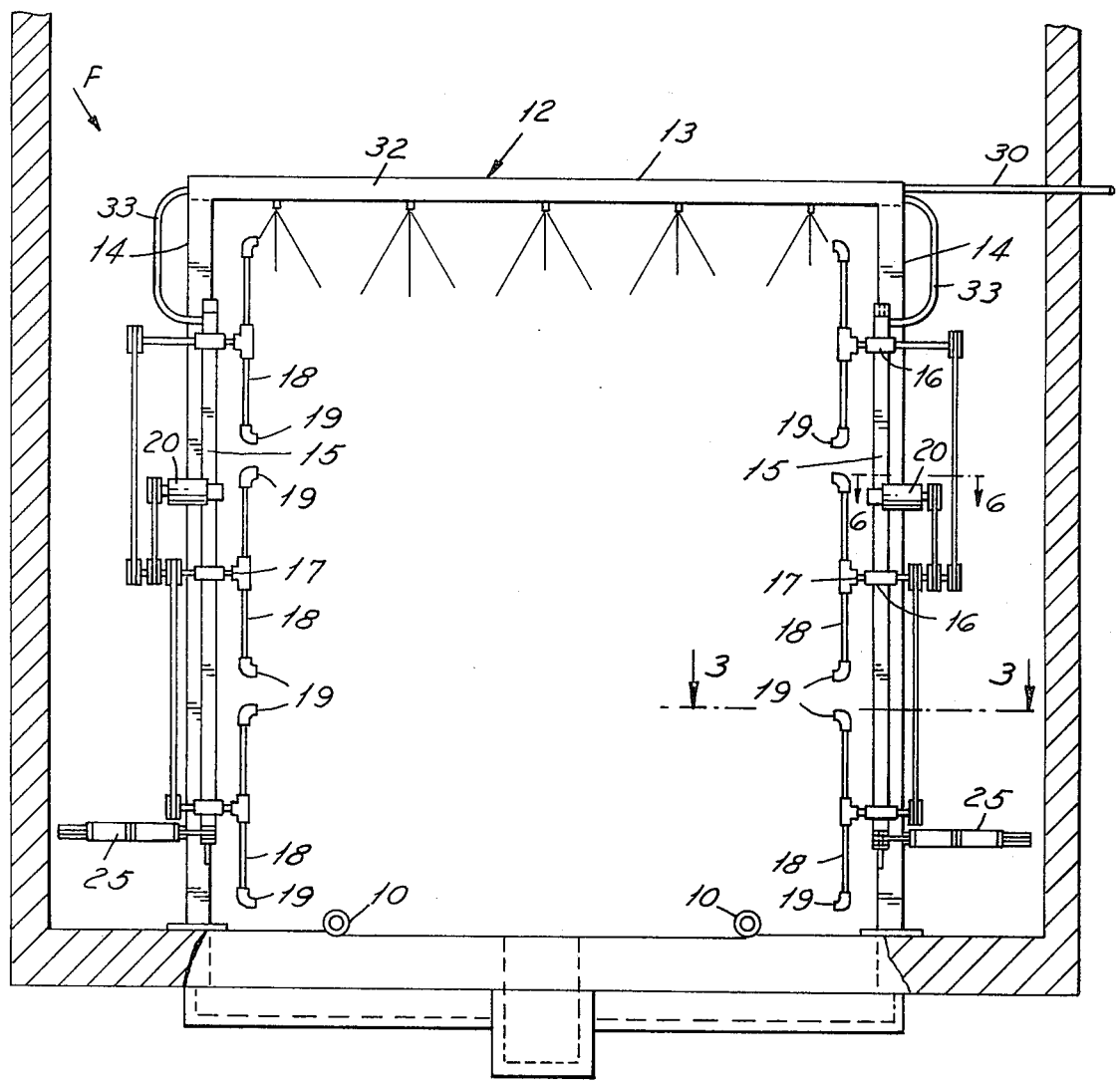
FIG. 2 is a front elevational view taken along the line 2—2 in FIG. 1.
Figure 3:
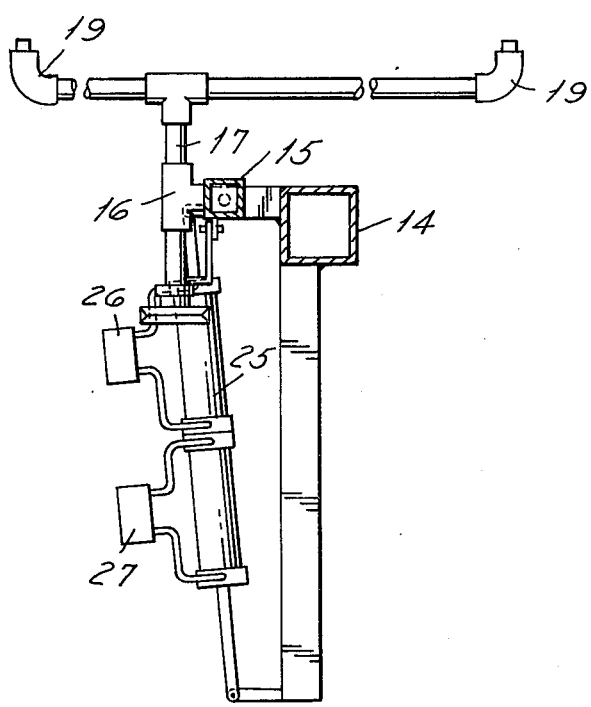
FIG. 3 is a sectional view taken along the line 3—3 in FIG. 2.
Figure 5:
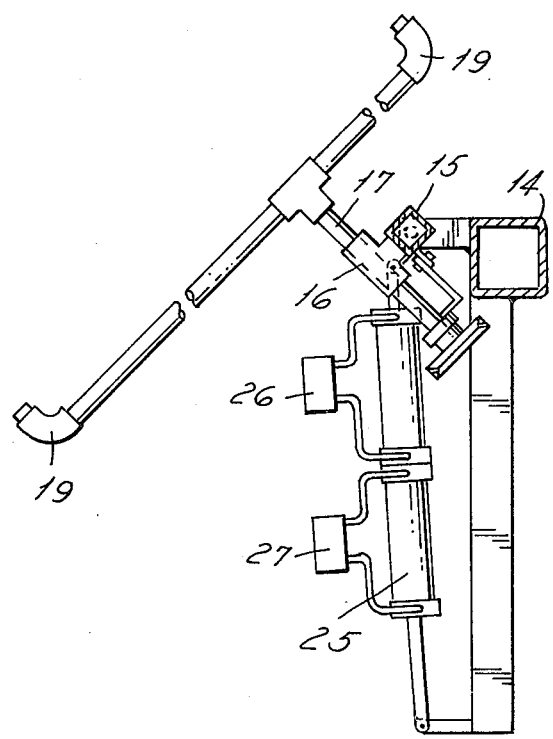
FIG. 5 is a view similar to FIG 3 showing the parts in a further different operative position.
Figure 4:
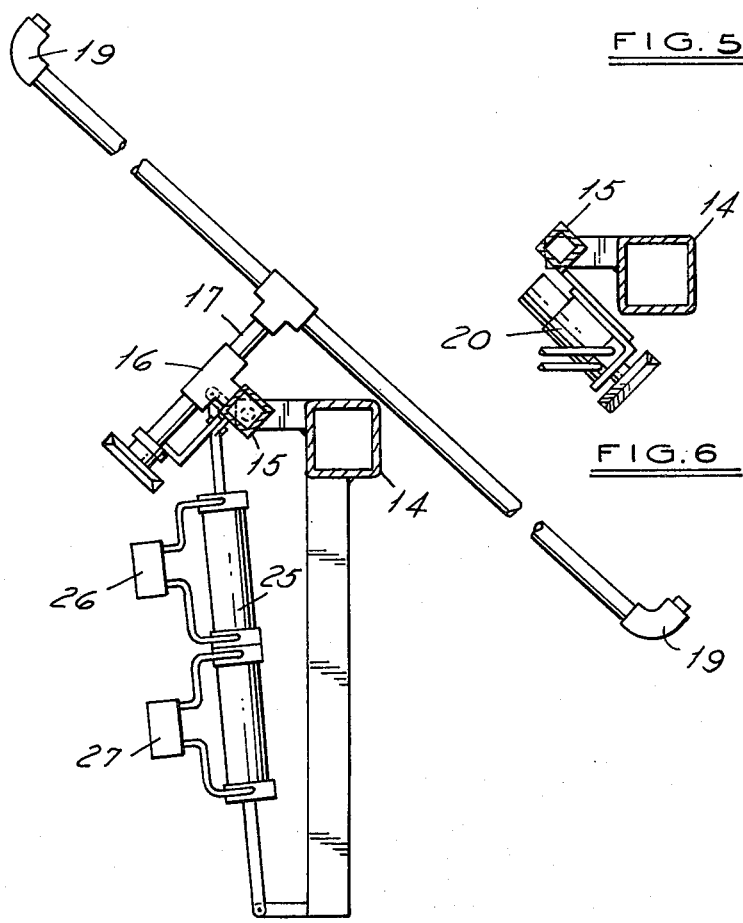
FIG. 4 is a view similar to FIG. 3 showing the parts in a different operative position.
Figure 6:
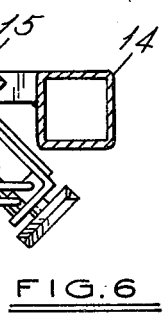
FIG. 6 is a part sectional plan view showing the drive for rotating the spray nozzles.

Initially, a fixed arch 11 is provided through which the truck is driven for application of a pre-wash if required.

As the truck is further driven through the apparatus, it passes through a second arch 12 that comprises a horizontal support 13 having nozzles 14 for directing various cleaning fluids and detergents and water downwardly onto the truck. The arch 12 further includes vertical supports 14 on the opposite sides of the truck. A post 15 is rotatably mounted on the supports 14. Brackets 16 are provided at longitudinally spaced points on the rotatable post 15 and rotatably support a shaft 17 on which a pipe 18 is fixed. The pipe 18 supports spray nozzles 19 that direct streams of fluid laterally. The spray pipes 18 are rotatably driven by pulley and belts from a motor 20.

Further, in acordance with the invention, the pipes 18 and, in turn, the spray nozzles 19 are indexed successively as the truck moves through the truck wash apparatus from a position wherein the spray nozzles direct fluid toward the front of the truck to a position wherein the spray nozzles direct fluid along the sides of the truck and, in turn, to a position wherein the spray nozzles direct against the rear of the truck as the truck is passing between the arch. The successive indexing between these three positions moves the plane of rotation of the pipes 18 from a position A to position B and, in turn, position C as shown diagrammatically in FIG. 1.

This movement is achieved by double piston motors 25 which have dual pistons so that application of fluids such as air thereto under the control of solenoids 26, 27 indexes the posts 15 and, in turn, the pipes 18 between the three successive positions.

Washing liquids such as detergent and water are supplied to the stream from a pipe 30 that passes to manifold 32 in the interior of support 13 for supplying the vertical nozzles. Communication is provided through a connecting pipe 33 to each post 15 for supplying fluid through the post and the connections to the pipe 18 and in turn the spray nozzles 19.

The schematic wiring diagram for controlling the apparatus embodying the invention is shown in FIG. 7 and comprises stop and start switches for controlling heaters. In addition, the circuit comprises a transformer for supplying current to a high pressure pump 1M, a pre-soak pump 2M, and a hydraulic pump 3M.

As a vehicle approaches the arch 11, the vehicle actuates a wand-type limit switch LS1 energizing relays M1, M2, and solenoid 1 that controls the flow of liquid to arch 11. Upon leaving arch 11, limit switch 1 is de-energized and, in turn, de-energizes relays M1, M2, and solenoid 1.

As the vehicle approaches the second arch 12, it actuates another wand-type limit switch LS2 energizing relays M1, M3, and solenoid 2, the latter insuring that the solenoids 26, 27 are selectively actuated to index the posts 15 and turn the pipes 18 to position A so that the front of the truck will be washed. As the vehicle further moves toward the arch 12, it actuates another wand-type switch LS3 energizing solenoid 3 to index through the solenoids 26, 27 the posts 15 and, in turn, the pipes 18 to position B to wash the sides of the vehicle.

As the vehicle leaves switch LS3, solenoid 4 is energized to actuate the solenoids 26, 27 and index the pipes 18 to position C to wash the rear of the vehicle. This continues for the time interval for which timer T1 is set and finally the timer de-energizes solenoids 2, 3 and 4 and relays M1 and M3.

I claim:

1. In a truck wash apparatus wherein the truck is moved through the truck wash apparatus, the combination comprising
a pair of supports mounted along the path of the truck such that the truck moves between the supports,
a rotating fluid applicator for dispensing fluid from spaced points along the length thereof,
and means for supporting said fluid applicator for rotation such that the applicator has a plane of rotation,
means independent of direct contact with said truck for successively indexing between three positions including a first position wherein the plane of rotation is at an angle facing the truck as the truck approaches the supports, a second position wherein the plane of rotation of said applicator is parallel to the path of the truck, and a third position wherein the plane of rotation is at an angle facing away from the truck as the truck moves away from the supports such that as the truck moves toward the supports, the rotating fluid applicators are positioned at said first position with the plane of rotation at an angle to the oncoming truck for directing liquid toward the front of the truck, as the truck continues to move through the system and between the supports, the rotating applicators are indexed to said second position wherein the plane of rotation thereof is generally parallel to the path of the truck for directing liquid toward the side of the truck, and as the truck finally moves away from the supports, the applicators are indexed to said third position such that the plane of rotation thereof is at an angle for directing fluid toward the rear of the truck. said lastmentioned means comprising a post rotatably mounted about a generally vertical axis on said support, a plurality a brackets on said post, and each said bracket rotatably supporting a fluid applicator.

2. The combination set forth in claim 1 including means responsive to approach of a truck to said apparatus and movement of a truck past said apparatus to index said fluid applicators to said successive positions.

3. The combination set forth in claim 1 wherein said last-mentioned means further includes fluid operated means interposed between said post and said support for indexing said post and, in turn, said fluid applicators to said successive positions.

4. In a truck wash apparatus wherein the truck is moved through the truck wash apparatus, the combination comprising
a pair of supports mounted along the path of the truck such that the truck moves between the supports,
a plurality of rotating fluid applicators for dispensing fluid from spaced points along the length thereof,
each said fluid applicator comprising a pipe having spaced spray nozzles therein,
and means for supporting said fluid applicator for rotation such that the applicator has a plane of rotation,
means independent of direct contact with said truck for successively indexing between three positions including a first position wherein the plane of rotation is at an angle facing the truck as the truck approaches the supports, a second position wherein the plane of rotation of said pipe is parallel to the path of the truck, and a third position wherein the plane of rotation is at an angle facing away from the truck as the truck moves away from the supports such that as the truck moves toward the supports, the pipes are positioned at said first position with the plane of rotation at an angle to the oncoming truck for directing liquid toward the front of the truck, as the truck continues to move through the system and between the supports, the rotating pipes are indexed to said second position wherein the plane of rotation thereof is generally parallel to the path of the truck for directing liquid toward the side of the truck, and as the truck finally moves away from the supports, the pipes are indexed to said third position such that the plane of rotation thereof is at an angle for directing fluid toward the rear of the truck, said last-mentioned means comprising a post rotatably mounted about a generally vertical axis on said support, a plurality of brackets on said post, and each said bracket rotatably supporting a fluid applicator.

5. The combination set forth in claim 4 including means responsive to approach of a truck to said apparatus and movement of a truck past said apparatus to index said fluid applicators to said successive positions.

6. The combination set forth in claim 4 wherein said last-mentioned means further includes fluid operated means interposed between said post and said support for indexing said post and, in turn, said fluid applicator to said successive positions.

* * * * *